Oct. 5, 1954 — F. PAWLING — 2,690,816
AUTOMATIC REVERSER FOR LUBRICATING SYSTEMS
Filed Dec. 15, 1952 — 3 Sheets-Sheet 1

INVENTOR.
FRANK PAWLING
BY
RICHEY, WATTS, EDGERTON & McNENNY
Frederic B. Schramm
ATTORNEYS Oct. 5, 1954        F. PAWLING        2,690,816
AUTOMATIC REVERSER FOR LUBRICATING SYSTEMS
Filed Dec. 15, 1952                              3 Sheets-Sheet 2
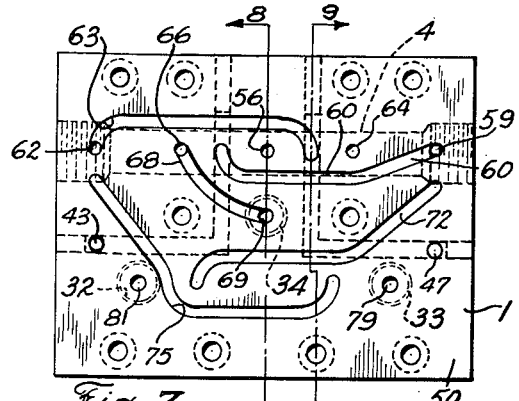
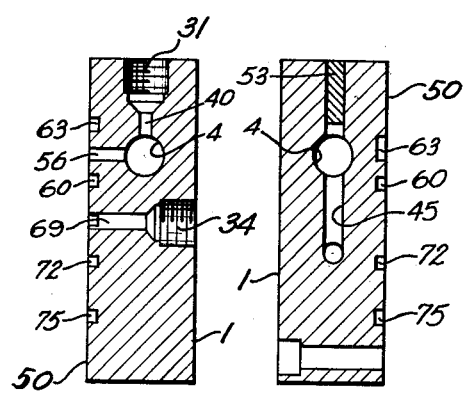
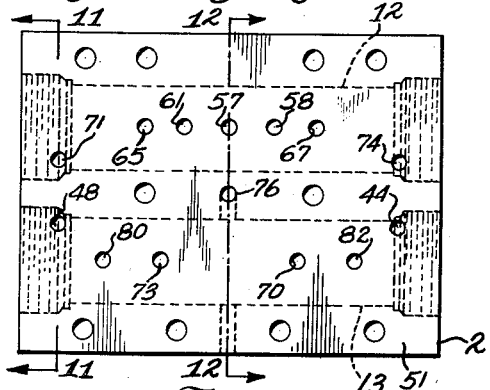
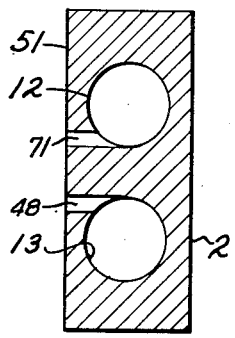
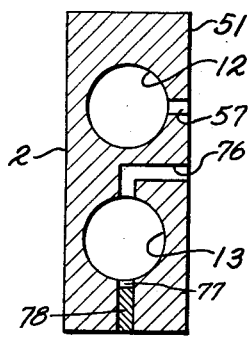
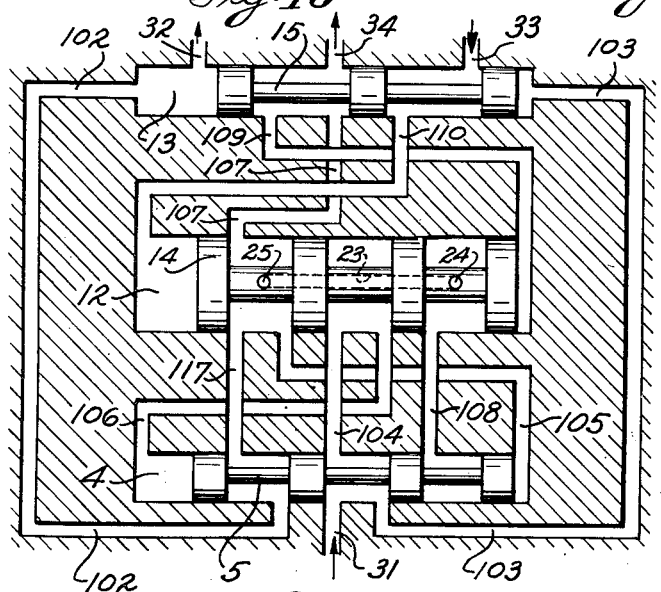
INVENTOR.
FRANK PAWLING
BY
RICHEY, WATTS, EDGERTON & McNENNY
ATTORNEYS Oct. 5, 1954  F. PAWLING  2,690,816
AUTOMATIC REVERSER FOR LUBRICATING SYSTEMS
Filed Dec. 15, 1952  3 Sheets-Sheet 3

INVENTOR.
FRANK PAWLING
BY
RICHEY, WATTS, EDGERTON & McNENNY
Fredric B. Schramm
ATTORNEYS Patented Oct. 5, 1954

2,690,816

UNITED STATES PATENT OFFICE 2,690,816

AUTOMATIC REVERSER FOR LUBRICATING SYSTEMS

Frank Pawling, South Croyden, England, assignor to Trabon Engineering Corporation, Cleveland, Ohio Application December 15, 1952, Serial No. 325,908

7 Claims. (Cl. 184—7)

This invention relates to fluid reversers for lubricating systems and, more particularly, to a reverser for automatically reversing the direction of flow in a closed lubricant distributing circuit.

An object of the invention is to reverse the direction of flow of lubricant in a system in which the lubricant is pumped from a sump or reservoir to bearings or distributors and then returned to the sump.

Another object of the invention is to reverse the direction of flow of lubricant from a pump into one end of a conduit loop and utilize the return lubricant from the remaining end of the loop to reverse the direction of flow.

A further object of the invention is to provide an improved reverser for the accomplishment of the above-referenced objects and one which is also of relatively simple construction and dependable and positive in operation.

A device of the type to which the present invention relates may be used, for example, in lubricating systems in which the circuit includes one or more metering or distributing devices which divert from the circuit a predetermined amount of a lubricant, such as grease or oil, each time the direction of flow in the circuit reverses.

According to the invention, the reverser comprises a housing having two main outlets for connection to the ends of a closed external circuit and a main inlet for connection to a source of lubricant under pressure as, for example, a grease pump. Three shuttle valves incorporated in three independent bores in the housing are provided, one valve designated as a pilot valve being operable by return flow of lubricant from the external conduit to change the connection of the main inlet from one end to the other of a second valve designated as a main valve. The main valve is thereby operated to change the connection of the main inlet from one end to the other of a third valve designated as a diverter valve to operate the diverter valve and to cause it to divert the flow of lubricant from the main inlet to the one end of the external circuit and to divert the return flow of lubricant from the remaining end of the external circuit to the pilot valve. The main valve serves also to connect the end of the closed circuit containing high pressure lubricant to an exhaust during operation of the diverter valve to thereby relieve the high pressures and prevent false operation of the pilot valve.

In accordance with the preferred embodiment of the invention, the housing is divided into two pieces which are disposed in mating relation along opposing faces. At least some of the internal connections between the several valves are formed by grooves in the face of one of the pieces.

The bores for two of the valves are provided in one part of the housing and a bore for the third valve is provided in the remaining part of the housing. Each bore may be contained wholly within the appropriate part and be closed at its end by plugs. The several bores may be parallel, one to the other.

It is a feature of one form of the invention that the pilot valve is hollow and serves as a part of a passage for the flow of lubricant in the device. Such an arrangement is not, however, essential to the practice of the invention, and alternative passage arrangements may be utilized.

Further objects, features and advantages of the invention will be more fully understood from a consideration of the following detailed description and claims taken in connection with the accompanying drawings, in which:

Fig. 7 is a view of the part of the housing enclosing the main valve and showing particularly the disposition of the passageway grooves in the face thereof;

Fig. 8 is a vertical section taken in the line 8—8 of Fig. 7;

Fig. 9 is a vertical section taken on the line 9—9 of Fig. 7;

Fig. 10 is a view of the part of the housing which encloses the pilot valve and the diverter valve and showing particularly the cooperating face;

Fig. 11 is a vertical section taken on the line 11—11 in Fig. 10;

Fig. 12 is a vertical section taken on the line 12—12 in Fig. 10; and

Figs. 13, 14 and 15 are schematic diagrams showing the interconnections of the various valves and showing the successive positions of the pistons of the valves in the operation of the reverser.

Figure 2:
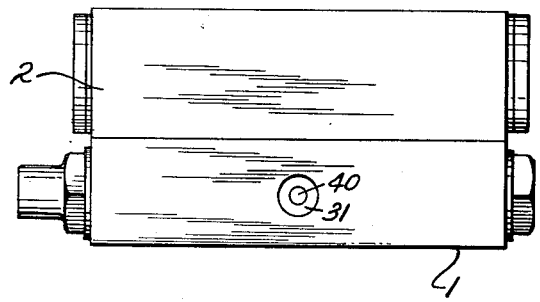
Fig. 2 is a top view.
Figure 1:
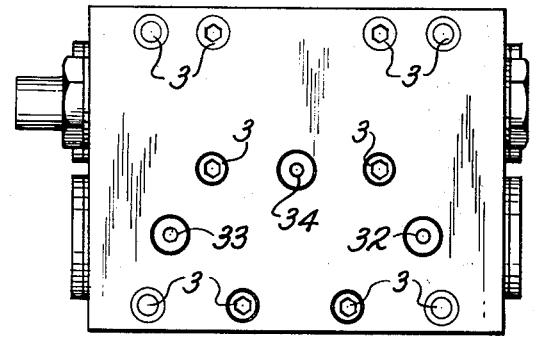
Fig. 1 is a front elevation of the device.

The reversing device of the illustrative embodiment of the invention comprises a two-part housing enclosing three shuttle valves. One housing part, part 1, is shown in detail in Figs. 7–9, inclusive; and the other part, part 2, is shown in detail in Figs. 10–12, inclusive. The two parts are secured in face-to-face relation by screws 3.

The housing part 1 has a single cylindrical bore 4 enclosing a piston 5 to form a main valve for the reverser. The piston 5 moves from one end to the other of the cylinder and is provided with an indicator 6 to show the position of the piston.

Figures 3, 4, 5:
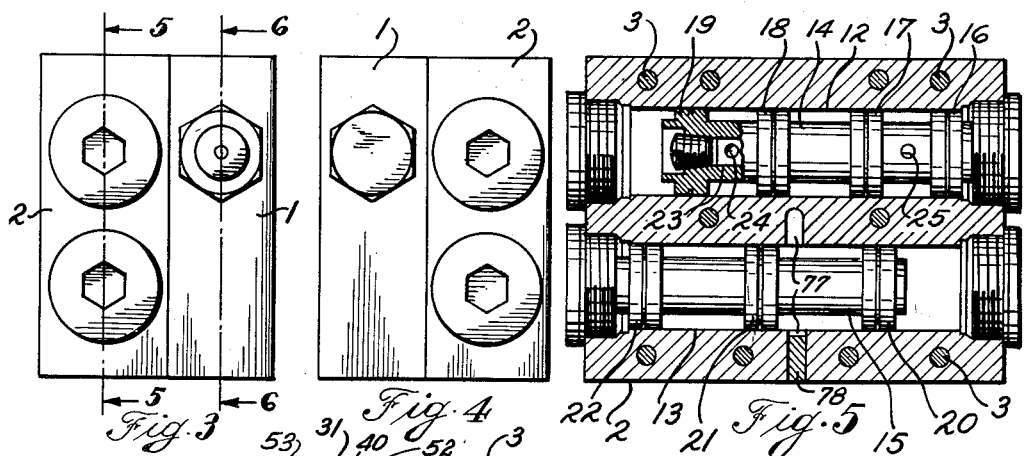
Figs. 3 and 4 are end views referable to Fig. 1.
Fig. 5 is a vertical section view taken in the direction 5—5 in Fig. 3 and showing the pilot valve and the diverter valve.
Figure 6:
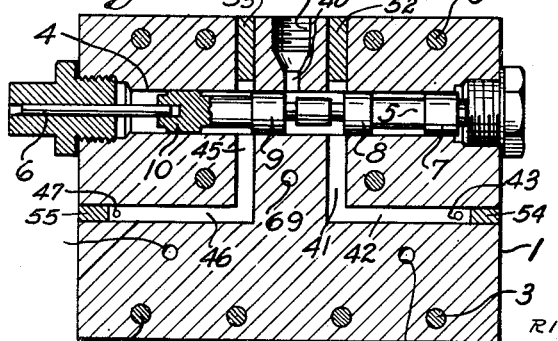
Fig. 6 is a vertical section taken in the direction 6—6 of Fig. 3 and showing particularly the main valve.

The housing part 2 has two cylindrical bores 12 and 13 which receive pistons 14 and 15 to form a pilot valve and a diverter valve respectively. The piston 14 of the pilot valve has four lands 16, 17 and 18 and 19, respectively, to form a valve having three valve stages and two drive stages. According to this designation, adjacent lands cooperate to form valve stages while an end land forms a drive stage with the end of the cylinder. The piston 14 has an internal opening 23 and radial openings 24 and 25 to provide communication between the spaces enclosed by the lands 16 and 17 and 18 and 19 respectively. The piston 15 has lands 20, 21 and 22 forming a valve having two valve stages and two drive stages. The cylinder bores are preferably formed with smooth and accurately aligned surfaces, while the lands of the pistons are adapted to cooperate with the surfaces of the bores to provide a lubricant-tight seal. Any suitable means may be provided in the lands to improve the fluid seal, such as is shown for example in Fig. 5, by grooves in the surfaces of the lands.

The housing has a main inlet 31 adapted to be connected to a source of lubricant under pressure such as, for example, a grease pump. Two main outlets 32 and 33 are adapted to be connected to the ends of any lubricating system which forms a closed circuit, that is from the reverser to the desired lubricant utilizing points and back to the reverser. An exhaust outlet 34 may be connected to a sump or reservoir for returning the unused lubricant to the pump.

The housing has internal passages interconnecting the main inlet, the cylinder bores, the main outlets and the exhaust outlet to form an operative mechanism adapted to function to accomplish the purpose of the invention. The general relation of these passages to those elements of the reverser, e. g. the mode of interconnection, may best be appreciated from the schematic diagrams of Figs. 13, 14 and 15 wherein the successive positions of the pistons 5, 14 and 15 are shown for a typical phase of one cycle of operation. The representations of the passages in Figs. 13 to 15, inclusive, are schematic in nature, inasmuch as those passages are, generally speaking, composite in nature. The passages are formed by releated openings in either of the housing parts 1 and 2, as may be understood with reference particularly to Figs. 5 to 12, inclusive.

The main inlet 31 is formed in the top portion of the housing part 1 and is connected to the cylinder 4 of the main valve by means of an opening 40. The opening 40 and the cylinder 4 together form an inlet port for the main valve.

The main valve is operatively connected to the diverter valve by means of two passages 102 and 103 which serve to transmit lubricant from the main inlet to either end of the diverter valve for shifting the diverter valve piston 15 and transmission into the appropriate one of the main outlets 32 and 33. The passage 102 comprises an opening 41 which extends downwardly from the top of the housing part 1 so as to intersect the cylinder 4 at an appropriate distance from the opening 40. The opening 41 is intersected by a second similar opening 42 which extends from the right end of the housing part 1, while an opening 43 extends from the outer end of the opening 42 to the face 50 of the housing part 1. A corresponding opening 44 extends from the mating face 51 of the housing part 2 inwardly to intersect the cylinder 13 of the diverter valve adjacent the end thereof. The passage 103 is similar to the passage 102 and is formed by openings 45, 46, 47 and 48 which correspond successively with those of the passage 102. The passages 41 and 45 are closed at the outer extremities thereof by suitable plugs 52 and 53 while the passages 42 and 46 are closed at the outer extremities thereof by plugs 54 and 55.

The openings 41 and 45 are appropriately spaced from the passage 40 so that the passage 40 may be connected to either the opening 41 or the opening 45 by the lands 8 and 9 of the piston 5 and separated from the remaining one of those openings when the piston 5 is in either extreme position. The openings 41 and 45 form, with the cylinder 4, outlet ports for the main valve.

The main inlet 31 is connected to the pilot valve by means of the passage 104 which serves to transmit the lubricant from the cylinder 4 of the main valve to the cylinder 12 of the pilot valve. The passage 104 comprises an opening 56 which extends from the cylinder 4 to the face 50 of the housing part 1. A corresponding opening 57 extends from the mating face 51 of the housing part 2 to the cylinder 12.

The passage 104 is operatively connected to either end of the main valve by the pilot valve, e. g. lubricant which is received in cylinder 12 from passage 104 may be transmitted to either end of the cylinder 4 through the passages 105 and 106 according to the position of the pilot valve 14. The passage 105 comprises an opening 58 which extends from the cylinder 12 at one side of the opening 57 to the face 51 of the housing part 2. The opening 58 is connected to an associated opening 59, which extends from the mating face 50 of the housing part 1 to the cylinder 4 at the end thereof, by means of a groove 60 which is cut in the facing portion of the housing part 1. Similarly, the passage 106 comprises an opening 61 at the remaining side of the opening 57 extending from the cylinder 12 to the face 51 of the housing part 2. The opening 61 is connected to an associated opening 62, which extends from the face 50 of the housing part 1 to the cylinder 4 at the remaining end thereof, by means of a groove 63 which is formed in the facing portion of the block of the housing part 1. The openings 58 and 61 form, with the cylinder 12, outlet ports for the pilot valve while the openings 59 and 62 form, with the cylinder 4, drive ports for the main valve.

Figure 13:
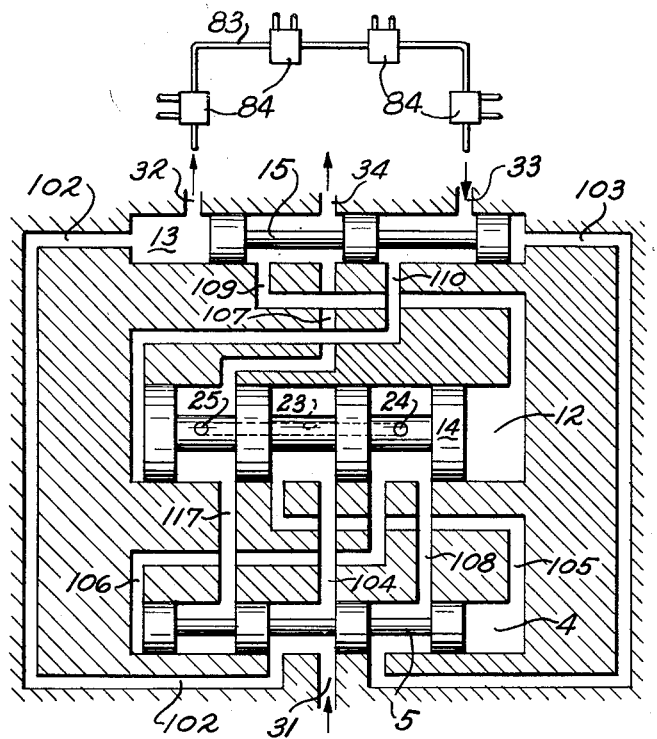

The passage 104 is interconnected with either passages 105 or 106 by the central lands 17 and 18 of the piston 14. The remaining one of these two passages is connected, together with one of the passages 102 or 103, to the exhaust outlet 34 through the exhaust passage 107. Thus, as is shown in Fig. 13, the passage 105 is connected to the passage 104 while passages 106 and 108, and therefore passage 103, are connected to the passage 107 and the exhaust outlet 34. Conversely, as is shown in Fig. 15, when the passage 104 is connected to the passage 106; passages 105 and 117, and therefore passage 102, are connected to passage 107 and to the exhaust outlet 34.

Passage 108 is formed by opening 64 which extends from the cylinder 4 to the face 50 of the housing part 1. A corresponding opening 65 extends from the mating face 51 of the housing part 2 to the cylinder 12. Similarly, the passage 117 is formed by an opening 66 which extends from the cylinder 4 to the face 50 of the housing part 1 and a corresponding opening 67 which extends from the mating face 51 of the housing part 2 to the cylinder 12. The openings 64 and 66 form with the cylinder 4 valve-ports for the main valve.

The passage 107 comprises a groove 68 which is formed in the facing portion of the housing part 1 and extends from the opening 66 to an opening 69 which extends from the face 50 of the housing part 1 to the exhaust outlet 34.

The passage 108 is connected to the passage 107 by the internal opening 23 and the radial openings 24 and 25. These openings permit fluid communication between the spaces between the lands 18 and 19, and 16 and 17, respectively, of the pilot valve piston 14, and hence between the openings 65 and 67.

The diverter valve receives lubricant fluid from either of the passages 102 and 103 and, by reason of the accommodating movement of the piston 15, causes the lubricant to be transmitted from the associated one of the main outlets 32 or 33. The lubricant fluid which is reversed at the remaining main outlet is transmitted to the pilot valve to actuate the pilot piston 14.

Thus, in Fig. 13 lubricant fluid is transmitted from passage 102 out the main outlet 32 through the external fluid circuit 83, back to the remaining main outlet 33 and through the passage 110 to the pilot valve cylinder 12. Similarly, when the lubricant is transmitted through passage 103, it flows out the main outlet 33, through external fluid circuit 83 back to the remaining main outlet 32 and thence through passage 109 to the pilot valve cylinder 12.

Passage 109 comprises the opening 70 which extends from the cylinder 13 to the face 51 of the housing part 2. The opening 70 is connected to the opening 71, which extends from the face 51 to the cylinder 12, by a groove 72 formed in the facing portion of the housing part 1. Similarly, passage 110 comprises opening 73 which extends from the cylinder 13 to the surface 51 of the housing part 2 and opening 74 which extends from the surface 51 to the cylinder 12 and an interconnecting groove 75 formed in the facing portion of the housing part 1.

The exhaust outlet 34 is connected to the diverter valve by means of the opening 69 which extends from the exhaust outlet to the face 50 of housing part 1, opening 76 which extends from the mating face 51 of the housing part 2 inwardly to intersect an opening 77 which extends upwardly from the bottom of the housing part. The opening 77 and the diverter valve cylinder 13 form an exhaust port for the diverter valve. The opening 77 is closed at the lower end by plug 78.

The main outlet 32 is connected to the cylinder 13 of the diverter valve by an opening 79 in the housing part 1 and a cooperating opening 80 in the housing part 2. The main outlet 33 is similarly connected to the cylinder 13 by an opening 81 in the housing part 1 and a cooperating opening 82 in the housing part 2. The openings 80 and 82 and the cylinder 13 form outlet ports for the diverter valve.

As shown in Fig. 13, the reverser is intended to be used as a part of a lubricating system and may be connected in a closed circuit 83 containing a number of distributors 84. These distributors are of the kind which, on initial flow of grease in one direction in the circuit, dispenses a measured amount of the grease to the bearing or other lubricant using device before permitting the flow to continue past the device. The distributor then repeats the operation upon reversal of the direction of flow in the circuit.

Figure 14:
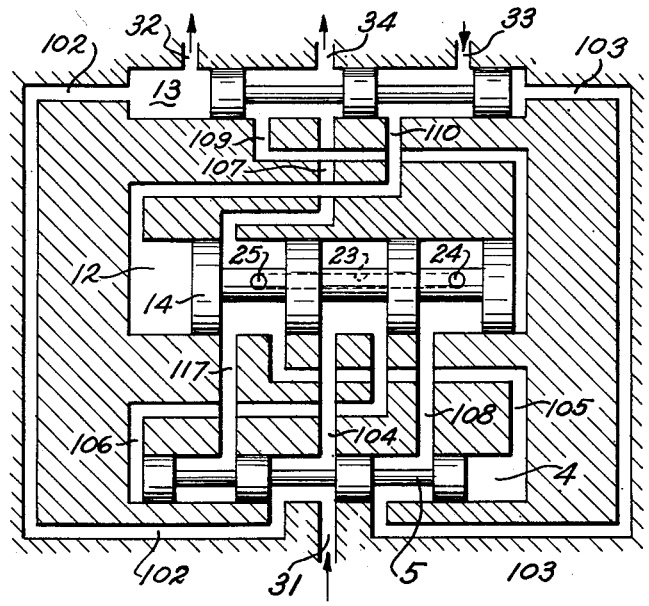

In the operation of the reverser as shown in successive steps from Fig. 13 to Fig. 15, inclusive, grease flows from the inlet 31 between the central lands of the piston 5 through the passage 102 to the cylinder 13. The piston 15 is forced toward the right hand end of the cylinder 13 and grease may then flow from the cylinder 13 out the main outlet port 32 to the circuit 40. Simultaneously therewith, the grease has been flowing through the passage 104 and into the space between the central lands of the piston 14 and through the passage 105 to the right end of cylinder 4, thus maintaining the piston 5 in position at the left end of the cylinder 4. The right end of the diverter valve cylinder 13 is connected to the outlet 34 through the passages 103, 108 and 107 so as to provide a relief for the grease in the right hand end of the cylinder 13 as the piston 15 moves to the right.

The grease flows through the circuit 40, and a portion thereof is returned to the main outlet 33 of the reverser. The grease flows between the central and right end lands of the diverter valve piston 15 and through the passage 110 to the left end of the pilot cylinder 12. The pilot piston 14 is then forced to the right to the position shown in Fig. 14, driving any grease in the right end of the cylinder 12 through the passage 109 and between the middle and left end lands of the diverter valve piston and out the exhaust 34.

Upon movement of the piston 14 to the right, the inlet passage 104 is connected to the passage 106 so that grease flows from the passage 104 between the central lands of piston 14 and through the passage 106 to the left end of the cylinder 4. The piston 5 is then forced to the right end of the cylinder 4 to the position shown in Fig. 15. Any grease in the right hand end of the cylinder 4 may flow to the exhaust 34 through the passages 105 and 107.

The movement of piston 5 to the right end of the cylinder 4 connects the inlet 31 with the passage 103 so that grease may flow through the space between the central lands of the piston 5 through the passage 103 and into the right end of the cylinder 13. The cylinder 15 is thereby forced to the left, and the grease flows into the lubricating circuit 40 in a direction opposite to that previously described. Upon flow of return fluid into the outlet 32, the entire process is repeated.

It will be understood from Fig. 15 that upon movement of the piston 5 to the right end of the cylinder 4 and before the piston 15 has moved sufficiently to the left to cover the outlet port associated with the main outlet 32, the passage 102 is connected to the main exhaust 34 through passages 117 and 107. The grease in the end of the circuit connected to the main outlet 32 is highly compressed and upon release of the compressive force due to the pump, the grease expands rapidly. Because of the arrangement of the main and pilot valves, the grease is permitted to flow through the passage 102 between the left end lands of piston 5 through the passage 117 between the left end lands of piston 14 and through the passage 107 to the outlet 34. The excess pressure is, therefore, substantially relieved prior to the connection of the outlet 32 with the passage 109. The possibility of false operation of the pilot valve is thereby minimized.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A fluid reverser for lubricating systems comprising a housing having two main outlets, an inlet and an exhaust outlet, and valves for connecting the inlet to either of the main outlets in response to flow of return fluid into the remaining outlet, including a diverter valve comprising a cylinder having a drive port at each end of said cylinder, an outlet port spaced inwardly from each end of the cylinder, each of the said outlet ports being connected to one of the said main outlets, a valve port spaced inwardly from each outlet port and an exhaust port positioned between the valve ports, a piston in the cylinder having a middle and two end lands in fluid-tight engagement with the walls of the cylinder and adapted to be moved from one end of the cylinder to the other to connect a drive port with an outlet port and a valve port with the exhaust port at one end of the cylinder and an outlet port with a valve port at the remaining end of the cylinder, a main valve for connecting said inlet to either of said drive ports comprising a second cylinder having an inlet port connected to the said main inlet, an outlet port at each side of said inlet port and connected to a corresponding drive port of the diverter valve, a valve port at each side of the inlet port outwardly from the associated outlet port communicating with the exhaust outlet, and a drive port at each end of the main valve cylinder, and a piston in the said main valve cylinder having four spaced lands in fluid-tight engagement with the walls of the said cylinder for connecting one outlet port to the inlet port and the remaining outlet port to the associated valve port when the piston is at either end of the cylinder and a pilot valve comprising a third cylinder having a drive port at each end of the cylinder connected to an associated valve port of the diverter valve toward the opposite end thereof, an inlet port connected to the main inlet and an outlet port at each side of the inlet port connected to an associated drive port of the said main valve at the opposite end thereof, and a piston in the said pilot valve cylinder comprising four spaced lands for connecting one outlet port to the inlet port when the piston is at either end of the cylinder in response to pressure of lubricant fluid returned to the main outlet associated with the end of the pilot valve cylinder to which the pilot valve piston is to be moved.

2. The invention in accordance with claim 1 characterized in that the housing is formed in two cooperating parts and that at least one of the valves is enclosed in one part and the remaining valves are enclosed in the remaining part.

3. The invention in accordance with claim 1 characterized in that the said housing is formed with two parts having cooperating inner faces in fluid-tight engagement and that the valves are interconnected by passages which include grooves in the inner face of at least one of the pieces.

4. The invention in accordance with claim 1, characterized in that the said housing is formed with two parts having cooperating inner faces in fluid-tight engagement and with the pilot valve in one part and the main valve in the remaining part and parallel thereto and horizontal passages extending between the said two valves, and the diverter valve being disposed below the level of the above-named valves and connected thereto by grooves formed in the facing portion of at least one of the parts.

5. The invention in accordance with claim 1, the said pilot valve having two valve ports, each spaced outwardly from an associated outlet port and connected to the corresponding valve ports of the main valve and means connecting the portions of the pilot valve cylinder between the two lands of the pilot valve piston toward each end thereof with the exhaust outlet of the reverser whereby each main outlet is connected to the exhaust outlet when the pilot valve and main valve are actuated to release the pressure of accumulated lubricant fluid in the main outlet before that outlet is connected to the pilot valve.

6. The invention in accordance with claim 5, the said connecting means comprising a passage in the housing communicating with the pilot valve cylinder at one end thereof and with the exhaust outlet at the remaining end thereof and an opening through the pilot valve piston between the two lands at one end of the piston and the two lands at the remaining end of the piston.

7. The invention in accordance with claim 5, the two lands toward the one end of the pilot valve piston serving to simultaneously interconnect the outlet port and the valve port of the pilot valve to the exhaust outlet prior to the actuation of the main valve so as to enable release of accumulated lubricant fluid in the end of the main valve cylinder as the main valve piston is moved to a position corresponding to that of the pilot valve piston.

References Cited in the file of this patent

UNITED STATES PATENTS

| Number | Name | Date |
|---|---|---|
| Re. 21,160 | Hillis | July 25, 1939 |
| 2,022,005 | Leonard | Nov. 26, 1935 |
| 2,266,204 | Hull | Dec. 16, 1941 |
| 2,622,697 | Higgens | Dec. 23, 1952 |